(12) United States Patent  
Chen

(10) Patent No.: US 11,023,716 B2  
(45) Date of Patent: Jun. 1, 2021

(54) METHOD AND DEVICE FOR GENERATING STICKERS

(71) Applicant: BEIJING BYTEDANCE NETWORK TECHNOLOGY CO., LTD., Beijing (CN)

(72) Inventor: Riwei Chen, Beijing (CN)

(73) Assignee: Beijing Bytedance Network Technology Co., Ltd., Beijng (CN)

( * ) Notice: Subject to any disclaimer, the term of this patent is extended or adjusted under 35 U.S.C. 154(b) by 0 days.

(21) Appl. No.: 17/021,442

(22) Filed: Sep. 15, 2020

(65) Prior Publication Data

US 2021/0004574 A1 Jan. 7, 2021

Related U.S. Application Data

(63) Continuation of application No. PCT/CN2020/078587, filed on Mar. 10, 2020.

(30) Foreign Application Priority Data

May 27, 2019 (CN) .......................... 201910447997.8

(51) Int. Cl.
  *G06K 9/00* (2006.01)
  *G06N 3/04* (2006.01)

(52) U.S. Cl.
  CPC ..... *G06K 9/00315* (2013.01); *G06K 9/00275* (2013.01); *G06K 9/00744* (2013.01);
  (Continued)

(58) Field of Classification Search
  CPC ........... G06K 9/00315; G06K 9/00275; G06K 9/00744; G06K 9/00765; G06K 2209/21; G06N 3/0454
  See application file for complete search history.

(56) References Cited

U.S. PATENT DOCUMENTS

| | | | |
|---|---|---|---|
| 2011/0029471 A1 | 2/2011 | Chakradhar et al. | |
| 2017/0316256 A1* | 11/2017 | Kim | G06K 9/00342 |
| 2020/0134296 A1* | 4/2020 | Rajvanshi | G06F 3/0482 |

FOREIGN PATENT DOCUMENTS

| CN | 106125929 A | 11/2016 |
|---|---|---|
| CN | 106658079 A | 5/2017 |

(Continued)

OTHER PUBLICATIONS

International Patent Application No. PCT/CN2020/078587; Int'l Written Opinion; dated Jun. 1, 2020; 2 pages.

*Primary Examiner* — David F Dunphy

(74) *Attorney, Agent, or Firm* — BakerHostetler

(57) ABSTRACT

A method and a device for generating stickers are provided. An embodiment of the method includes extracting an image sequence from a person-contained video to be processed; identifying emotions of the faces respectively displayed by each of the target images in the image sequence to obtain corresponding identification results; based on the emotional levels corresponding to the emotion labels in the identification results corresponding to each of the target images, extracting a video fragment from the person-contained video, and acting the video fragment as the stickers. The image sequence comprises target images displaying faces; the identification results comprise emotion labels and emotional levels corresponding to the emotion labels. The embodiment can extract the video fragment from the given person-contained video to act as stickers based on the facial emotion match, which can achieve the generation of stickers based on the facial emotion match.

15 Claims, 5 Drawing Sheets

(52) U.S. Cl.
CPC ....... *G06K 9/00765* (2013.01); *G06N 3/0454* (2013.01); *G06K 2209/21* (2013.01)

(56) References Cited

FOREIGN PATENT DOCUMENTS

| | | |
|---|---|---|
| CN | 106951856 A | 7/2017 |
| CN | 108229268 A | 6/2018 |
| CN | 108460812 A | 8/2018 |
| CN | 108596114 A | 9/2018 |
| CN | 110162670 A | 8/2019 |
| KR | 2018-0072304 A | 6/2018 |

\* cited by examiner

METHOD AND DEVICE FOR GENERATING STICKERS

CROSS-REFERENCE TO RELATED DISCLOSURE

The disclosure is a continuation of PCT application Ser. No. PCT/CN2020/078587, filed on Mar. 10, 2020, which claims the priority benefit of CN disclosures Ser. No. 201910447997.8, filed on May 27, 2019, titled "METHOD AND DEVICE FOR GENERATING STICKERS", and the entirety of the above-mentioned patent disclosure will be hereby incorporated by reference herein and made a part of this specification.

TECHNICAL FIELD

The disclosure relates to a computer technical field, and more particularly to a method and a device for generating stickers.

DESCRIPTION OF RELATED ART

"Stickers" are a sort of manners to express emotions by pictures. A conventional social disclosure can support a user to send stickers. The stickers sent by the user generally are generated based on a given picture.

SUMMARY

Embodiments of the disclosure provide a method and a device for generating stickers.

In a first aspect, an embodiment of the disclosure provides a method for generating stickers, including extracting an image sequence from a person-contained video to be processed; identifying emotions of the faces respectively displayed by each of the plurality of target images in the image sequence to obtain corresponding identification results; based on the emotional levels corresponding to the emotion labels in the identification results corresponding to each of the plurality of target images, extracting a video fragment from the person-contained video, and acting the video fragment as the stickers. The image sequence comprises a plurality of target images displaying faces; the identification results comprise emotion labels and emotional levels corresponding to the emotion labels.

In some embodiments, identifying emotions of the faces respectively displayed by each of the plurality of target images in the image sequence to obtain corresponding identification results comprises: inputting each of the plurality of target images into pre-trained convolutional neural networks to obtain the corresponding identification results; wherein the convolutional neural networks are configured for identifying emotions.

In some embodiments, based on the emotional levels corresponding to the emotion labels in the identification results corresponding to each of the plurality of target images, extracting a video fragment from the person-contained video comprises: searching a first target image whose emotional level corresponding to the emotion label is not lower than a top threshold in a corresponding identification result from each of the plurality of target images; starting from the first target image in each of the plurality of target images, backward searching a second target image whose emotional level corresponding to the emotion label is not higher than a bottom threshold in an identification result corresponding to a first image; starting from the first target image in each of the plurality of target images, forward searching a third target image whose emotional level corresponding to the emotion label is not higher than the bottom threshold in the identification result corresponding to the third first image; and based on the second target image and the third target image, extracting the video fragment from the person-contained video.

In some embodiments, based on the second target image and the third target image, extracting the video fragment from the person-contained video comprises: capturing the video fragment by taking the second target image as an opening section and taking the third target image as an ending section from the person-contained video.

In some embodiments, based on the second target image and the third target image, extracting the video fragment from the person-contained video comprises: taking the second target image as a starting point and taking the third target image as an ending point, extracting a plurality of continuous target images from each of the plurality of target images, so as to form the video fragment by the plurality of continuous target images.

In some embodiments, before the identifying emotions of the faces respectively displayed by each of the plurality of target images in the image sequence to obtain corresponding identification results, the method further comprises: identifying the faces of each image in the image sequence to obtain a corresponding face detection result; wherein the face detection result is configured for indicating whether an image displays a face or not.

In a second aspect, an embodiment of the disclosure provides a device for generating stickers. The device includes an extraction unit, which is disposed to extract an image sequence from a person-contained video to be processed; an emotion identification unit, which is disposed to identify emotions of the faces respectively displayed by each of the plurality of target images in the image sequence to obtain corresponding identification results; and a generation unit, which is disposed to extract a video fragment from the person-contained video based on the emotional levels corresponding to the emotion labels in the identification results corresponding to each of the plurality of target images, and act the video fragment as the stickers. The image sequence comprises a plurality of target images displaying faces; the identification results comprise emotion labels and emotional levels corresponding to the emotion labels.

In some embodiments, the emotion identification unit is further disposed to: input each of the plurality of target images into pre-trained convolutional neural networks to obtain the corresponding identification results; wherein the convolutional neural networks are configured for identifying emotions.

In some embodiments, the generation unit comprises: a first searching subunit, which is disposed to search a first target image whose emotional level corresponding to the emotion label is not lower than a top threshold in a corresponding identification result from each of the plurality of target images; a second searching subunit, which is disposed to backward search a second target image whose emotional level corresponding to the emotion label is not higher than a bottom threshold in an identification result corresponding to a first image starting from the first target image in each of the plurality of target images; a third searching subunit, which is disposed to forward search a third target image whose emotional level corresponding to the emotion label is not higher than the bottom threshold in the identification result corresponding to the third first image starting from the first target image in each of the plurality of target images;

and an extracting subunit, which is disposed to extract the video fragment from the person-contained video based on the second target image and the third target image.

In some embodiments, the extracting subunit is further disposed to: cut the video fragment taking the second target image as an opening section and taking the third target image as an ending section from the person-contained video.

In some embodiments, the extracting subunit is further disposed to: taking the second target image as a starting point and taking the third target image as an ending point, extract a plurality of continuous target images from each of the plurality of target images, and generate the video fragment by the plurality of continuous target images.

In some embodiments, the device further includes: a face detection unit, disposed to identify the faces of each image in the image sequence to obtain a corresponding face detection result before the emotion identification unit identifies emotions of the faces respectively displayed by each of the plurality of target images in the image sequence; the face detection result is configured for indicating whether an image displays a face or not.

In a third aspect, an embodiment of the disclosure provides an electronic device. The electronic device includes one or more processors and a storage device stored with one or more programs therein; and when the one or more programs are executed by the one or more processors, the one or more processors perform any method in the forgoing methods for separating words.

In a fourth aspect, an embodiment of the disclosure provides a computer readable medium, stored with a computer program therein. The computer program is executed by a processor to perform any method in the forgoing methods for separating words.

The method and the device for generating stickers provided by the embodiments of the disclosure extract an image sequence from a person-contained video to be processed; identify emotions of the faces respectively displayed by each of the plurality of target images in the image sequence to obtain corresponding identification results; based on the emotional levels corresponding to the emotion labels in the identification results corresponding to each of the plurality of target images, extract a video fragment from the person-contained video, and act the video fragment as the stickers. The image sequence comprises a plurality of target images displaying faces; the identification results comprise emotion labels and emotional levels corresponding to the emotion labels. The scheme described by the forgoing embodiment of the disclosure can extract the video fragment from the given person-contained video to act as stickers based on the facial emotion match, which can achieve the generation of stickers based on the facial emotion match.

BRIEF DESCRIPTION OF THE DRAWINGS

According to the detailed description of unlimited embodiments with reference to figures as below, other features, objectives and advantages of the disclosure will be more obvious.

DETAILED DESCRIPTION OF PREFERRED EMBODIMENTS

The disclosure will be further described in detail in combination with accompanying drawings and embodiments. It should be understood that specific embodiments described herein are only for the purpose of explanation of the relevant disclosure, rather than to limit the disclosure. It should also be noted that, for convenience of description, only portions related to the relevant disclosure are shown in the accompanying drawings.

It should be noted that, in the case of no conflict, the embodiments of the disclosure and features of the embodiments can be combined with each other. The present disclosure will be described in detail below with reference to the accompanying drawings in combination with the embodiments.

Figure 1:
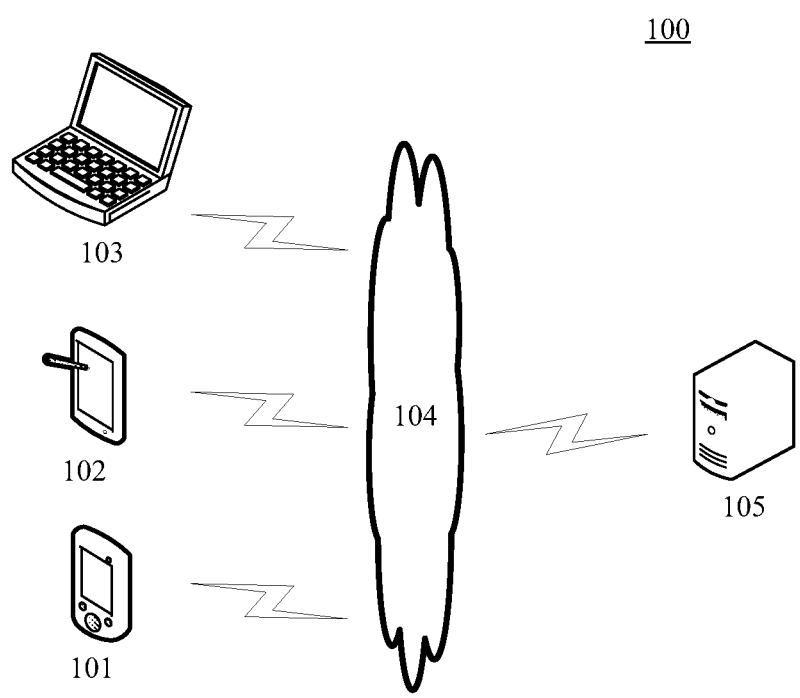
FIG. 1 is an exemplary system architecture diagram applied with an embodiment of the disclosure.

FIG. 1 shows an exemplary architecture 100 able to employ a method for generating stickers or a device for generating stickers of an embodiment of the disclosure.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

A user can user the terminal equipment 101, 102 and 103 to interact with the server 105 via the network 104 to receive or send messages. Various client applications, such as web browser application and sticker generation application, can be installed in the terminal equipment 101, 102 and 103.

The terminal equipment 101, 102 and 103 may be hardware or software. When the terminal equipment 101, 102 and 103 are hardware, the terminal equipment 101, 102 and 103 may be various kinds of electronic equipment, including but not limited to smart phones, tablets, portable laptops, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be the one for providing various services, such as a backstage server used for supporting sticker generation applications installed in the terminal equipment 101, 102 and 103. The backstage server can process information in response to a request for generating stickers sent from the terminal equipment 101, 102 and 103.

The method for generating stickers provided by some embodiments of the disclosure is generally executed by the server 105; correspondingly, the device for generating stickers generally is disposed in the server 105.

It should be noted that the server may be hardware or software. When being hardware, the server may be implemented as a distributed server cluster including a plurality of servers, and may also be implemented as the single server.

When being software, the server may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
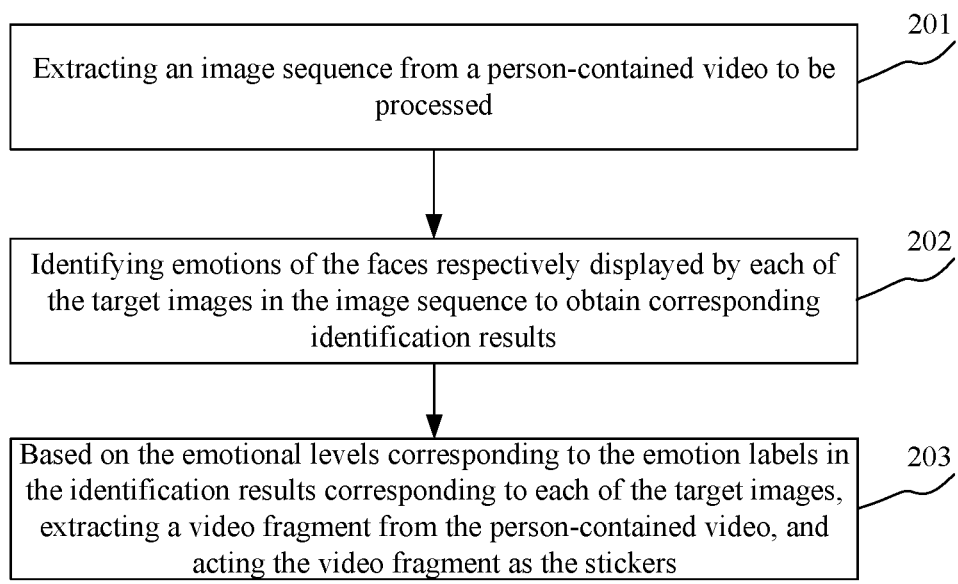
FIG. 2 is a flowchart of a method for generating stickers according to an embodiment of the disclosure.

Referring to FIG. 2, FIG. 2 shows a process 200 of a method for generating stickers according to an embodiment of the disclosure. The process 200 of the method for generating stickers includes following steps.

Step 201, an image sequence is extracted from a person-contained video to be processed.

In the embodiment, an executive body (as the server 105 shown in FIG. 1) for generating stickers can extract the image sequence from the person-contained video to be processed. The person-contained video is a video containing an image displaying a person. Several frames of images (such as all or a part thereof) in the person-contained video display a face of a person (face for short). The image sequence can include numerous target images displaying a face.

The forgoing executive body can form each frame of image in the person-contained video to be the image sequence. Or the executive body can extract images from the person-contained video based on a predetermined step size (such as 1 or 2), and form the extracted images to be the image sequence. Images in the image sequence are arranged according to the playing sequence of the person-contained video. The predetermined step size can be disposed according to the practical requirement, which will not be limited herein.

The forgoing executive body can receive a request for generating stickers from a terminal device (such as the terminal devices 101, 102, 103 shown in FIG. 1) by a user. The person-contained video can be a video included in the request for generating stickers received by the forgoing executive body.

Furthermore, if a part of images in the person-contained video display a face, the person-contained video can correspond to a face detection result. The face detection result can be configured for indicating whether each frame of image in the person-contained video displays a face or not. The face detection result can be received from the terminal device sending the request for generating stickers from the person-contained video. Or the executive body can send the person-contained video to a face detector in response to obtaining the forgoing person-contained video, and receive a corresponding face detection result from the face detector.

In some optional embodiments, if a part of images in the person-contained video display a face and the person-contained video fails to correspond to a face detection result, after the executive body extracts the image sequence, each image in the image sequence can be detected for a face to obtain the corresponding face detection result. For instance, the executive body can be disposed with a face detection model. The executive body can input the face detection model into each image in the image sequence to obtain the corresponding face detection result. The face detection model can be obtained by training models such as the naïve Bayesian model (NBM), the support vector machine (SVM), the eXtreme Gradient Boosting (XGBoost) or the convolutional neural networks (CNN).

Step 202, the face respectively displayed in each image in the image sequence can be identified to obtain a corresponding identification result.

In the embodiment, the executive body can determine a target image in the image sequence based on the face detection result described above. The executive body can identify emotion on the face respectively displayed in each target image in the image sequence to obtain a corresponding identification result. The identification result can include an emotion label and an emotional level corresponding to the emotion label. The emotion label can be a label configured for expressing an emotion (such as happiness, sadness). The emotion label is supposed to include a happiness label and an emotion label corresponding to the happiness label configured for indicating a happiness extent of the person corresponding to the face. The emotional level can be indicated by values within [0, 100]. In practice, the smaller the value, the lower the emotional level represents. The larger the value, the higher the emotional level represents.

As an example, the executive body can store an emotion template corresponding to the predetermined emotion locally. The emotion template can include numerous facial images and emotional levels respectively corresponding to the facial images. The executive body can match the target images and the facial images in the emotion template, and take the emotional levels corresponding to matched facial images and facial labels configured for indicating the predetermined emotions as the identification result corresponding to the target images.

In some optional embodiments, the executive body can input each target image into pre-trained convolutional neural networks to obtain the corresponding identification result. The convolutional neural networks can be configured for identifying an emotion. Input of the convolutional neural networks can include an image displaying a face. Output of the convolutional neural networks can include an emotion label and an emotional level corresponding to the emotion label.

Step 203, based on an emotional level corresponding to the emotion label in the identification result corresponding to each target image, a video fragment is extracted from the person-contained video, and the video fragment acts as stickers.

In the embodiment, the executive body can extract the video fragment from the person-contained video to act as the stickers based on the emotional level corresponding to the emotion label in the identification result corresponding to each target image.

Specifically, the executive body can extract the video fragment from the person-contained video based on the emotional level corresponding to the emotion label in the identification result corresponding to each target image, a predetermined high/top threshold (such as 90) and a low/bottom threshold (such as 50). The high threshold and the low threshold can be disposed according to the practical requirement, which will not be limited herein.

As an example, the executive body can obtain a first target image whose facial extent corresponding to the emotion label is not lower than the high threshold from the corresponding identification result by searching each target image. Subsequently, the executive body can obtain a second target image whose emotional level corresponding to the emotion label is not higher than the low threshold from the identification result corresponding to the first image by backward searching from the first target image of the target images. The executive body further can obtain a third target image whose emotional level corresponding to the emotion label is not higher than the low threshold from the identification result corresponding to the first image by forward searching from the first target image of the target images. Then, the executive body can extract the video fragment from the person-contained video based on the second target image and the third target image. For instance, the executive body can extract continuous target images from each target image by taking the second target image as a start point and taking the third target image as an end point, and generate the video fragment by the target images.

Figure 3:
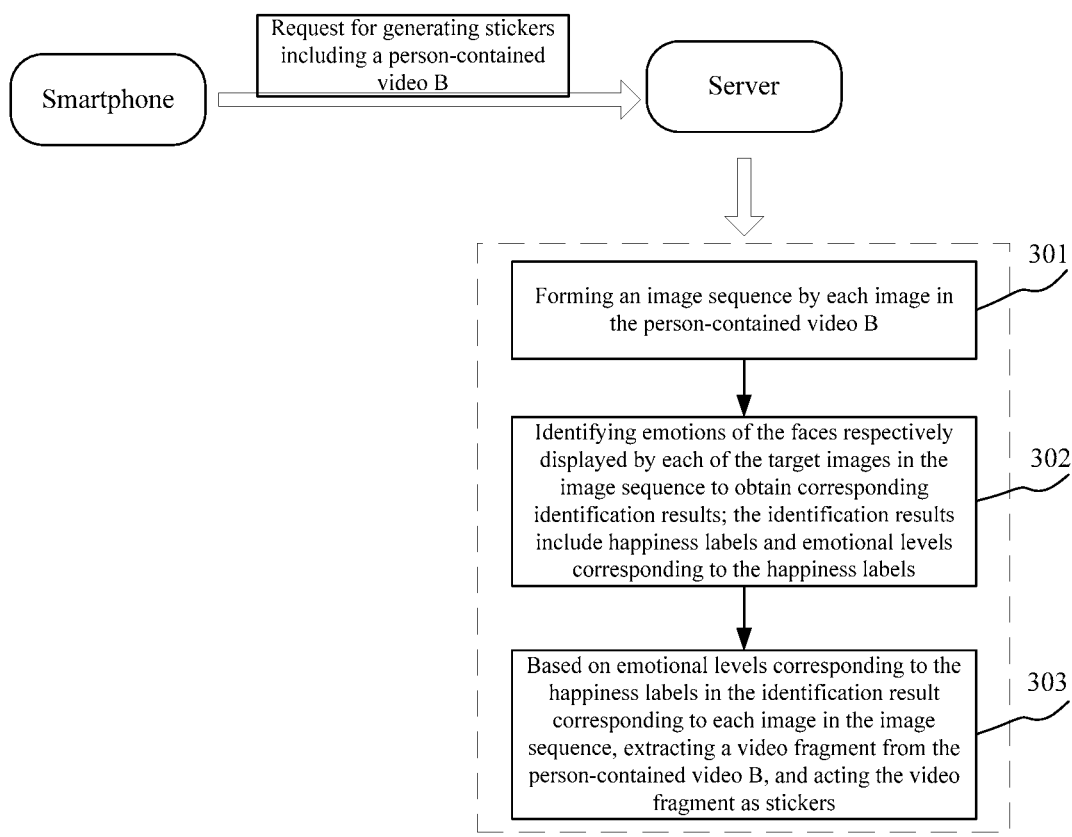
FIG. 3 is a schematic view of an application scenario of a method for generating stickers according to an embodiment of the disclosure.

Referring to FIG. 3, FIG. 3 is a schematic view of an application scenario of a method for generating stickers according to an embodiment of the disclosure. In the application scenario of FIG. 3, a smartphone of a user A can install an application able to generate stickers supported by a server. A predetermined emotion related to the application able to generate stickers includes happiness. The user A can select a person-contained video B to generate stickers in the application able to generate stickers, and subsequently trigger an operation to enable the smartphone to send a request for generating stickers including the person-contained video B to the server; each frame of image in the person-contained video B displays the face. The server can form each image in the person-contained video B to be the image sequence as shown by number 301 in response to the request for generating stickers. Images in the image sequence are arranged according to the playing order. Then, as shown by number 302, the server can identify faces respectively displayed by each image in the image sequence to obtain the corresponding identification result; the identification result can include a happiness label and the emotional level corresponding to the happiness label. Then, as shown by number 303, the server can extract the video fragment from the person-contained video based on facial extents corresponding to the happiness label in the identification result corresponding to each image in the image sequence, and take the video fragment as stickers.

The method provided by the forgoing embodiment of the disclosure includes extracting the image sequence from the person-contained video to be processed, and then identifying emotions of faces respectively displayed in each target image in the image sequence to obtain the corresponding identification result. The image sequence includes numerous target images displaying faces. The identification result includes emotion labels and emotional levels corresponding to the emotion labels for the sake of extracting the video fragment based on the emotional levels corresponding to the emotion labels in the identification result corresponding to each target image, and the video fragment acts as stickers. The scheme described by the forgoing embodiment of the disclosure can extract the video fragment from the given person-contained video to act as stickers based on the facial emotion match, which can achieve the generation of stickers based on the facial emotion match.

Figure 4:
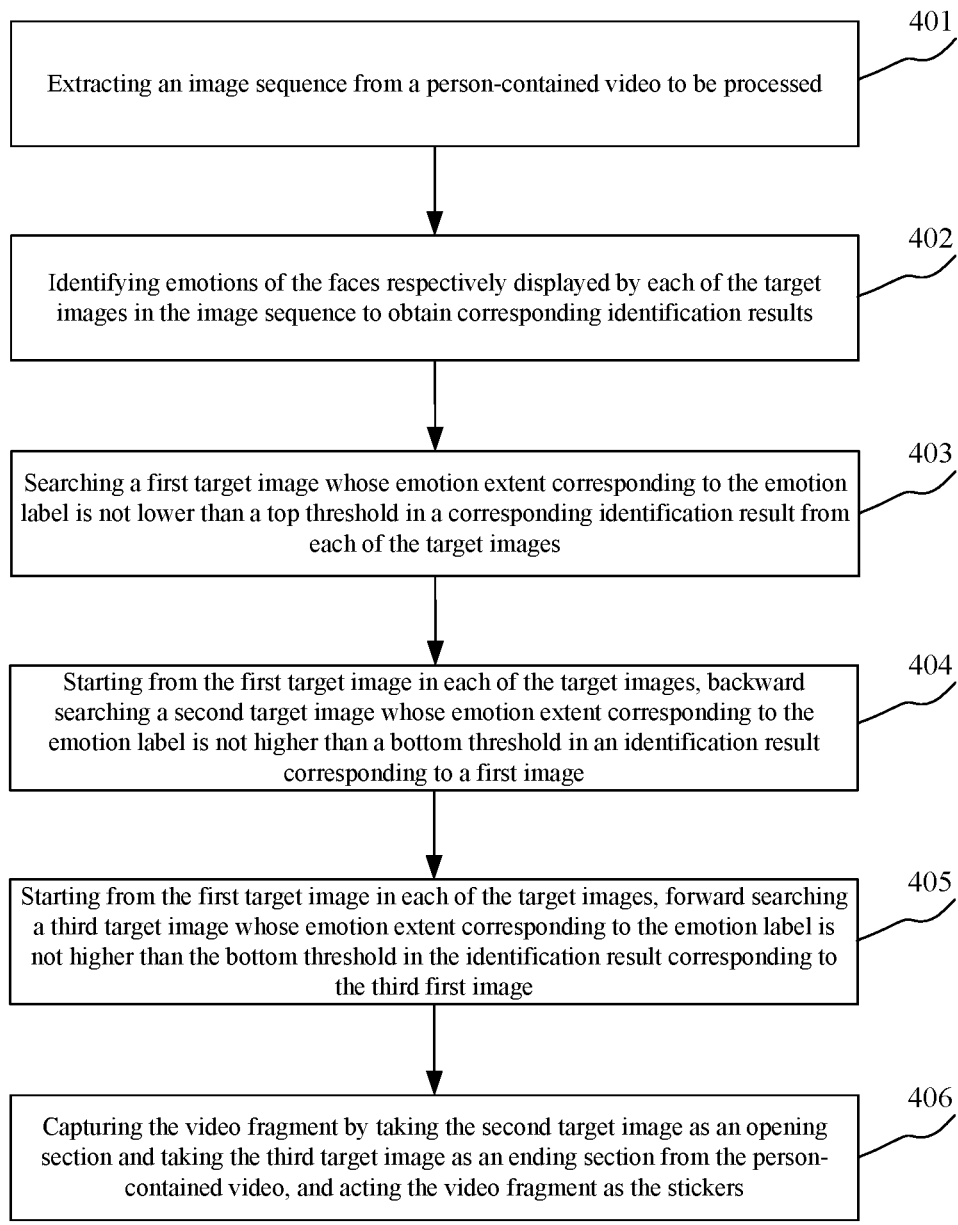
FIG. 4 is a flowchart of a method for generating stickers according to another embodiment of the disclosure.

Referring to FIG. 4, FIG. 4 shows a process 400 of a method for generating stickers according to another embodiment of the disclosure, which includes following steps.

Step 401, an image sequence is extracted from a person-contained video to be processed.

Step 402, faces respectively displayed by each target image in the image sequence are identified to obtain a corresponding identification result.

In the embodiment, the illustration of steps 401-402 can be referred to relative illustration of steps 201-202 in the embodiment shown as FIG. 2, which will not be repeated herein.

Step 403, a first target image whose facial extent corresponding to the emotion label is not lower than the high threshold is obtained from the corresponding identification result by searching each target image.

In the embodiment, regarding the emotion label in the identification result corresponding to each target image, the executive body of the method for generating stickers (such as the server 105 shown in FIG. 1) can obtain the first target image whose facial extent corresponding to the emotion label is not lower than the high threshold (such as 90) from the corresponding identification result by searching each target image.

Step 404, a second target image whose emotional level corresponding to the emotion label is not higher than the low threshold from the identification result corresponding to the first image by backward searching from the first target image of the target images.

In the embodiment, regarding the emotion label in the identification result corresponding to each target image, the executive body can obtain the second target image whose emotional level corresponding to the emotion label is not higher than the low threshold (such as 50) from the identification result corresponding to the first image by backward searching from the first target image of the target images after searching the first target image based on the emotional level corresponding to the emotion label.

Step 405, a third target image whose emotional level corresponding to the emotion label is not higher than the low threshold from the identification result corresponding to the first image by forward searching from the first target image of the target images.

In the embodiment, regarding the emotion label in the identification result corresponding to each image, the executive body further can obtain the third target image whose emotional level corresponding to the emotion label is not higher than the low threshold from the identification result corresponding to the first image by forward searching from the first target image of the target images after searching the first target image based on the emotional level corresponding to the emotion label.

Step 406, a video fragment taking the second target image as an opening section and taking the third target image as an ending section is cut from the person-contained video, and the video fragment acts as stickers.

In the embodiment, regarding the emotion label in the identification result corresponding to each target image, the executive body can cut the video fragment taking the second target image as an opening section and taking the third target image as an ending section from the person-contained video after obtaining the first target image as well as the second target image and the third target image corresponding to the first image by searching the target images based on the emotional levels corresponding to the emotion labels, and the video fragment acts as stickers.

It can be seen from FIG. 4, compared with the embodiment corresponding to FIG. 2, the process 400 of the method for generating stickers in the embodiment highlights the step to extend the method for extracting the video fragment. Therefore, the scheme described in the embodiment can achieve the diversity of information processes, and can generate stickers having good entertainment value and effectiveness.

Figure 5:
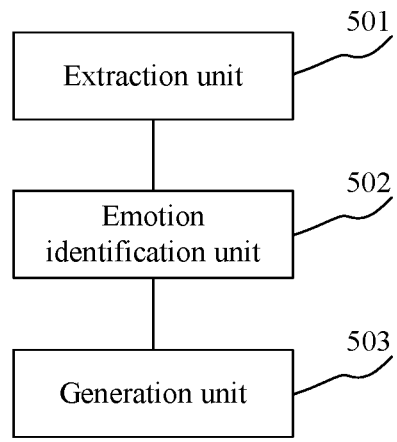
FIG. 5 is a structural schematic view of a device for generating stickers according to an embodiment of the disclosure.

Referring to FIG. 5, as the implement of the methods as shown in forgoing figures, the disclosure provides an embodiment of a device for generating stickers. The device embodiment is corresponding to the method embodiment shown as FIG. 2. The device specifically can be applied in various electronic devices.

As shown in FIG. 5, a device 500 for generating stickers of the embodiment can include an extraction unit 501 disposed to extract an image sequence from a person-contained video to be processed; an emotion identification unit 502 disposed to identify emotions of the faces respectively displayed by each of the plurality of target images in the image sequence to obtain corresponding identification results; a generation unit 503 disposed to extract a video fragment from the person-contained video based on the emotional levels corresponding to the emotion labels in the identification results corresponding to each of the plurality of target images, and act the video fragment as the stickers. The image sequence comprises a plurality of target images displaying faces; the identification results comprise emotion labels and emotional levels corresponding to the emotion labels.

In the embodiment, in the device 500 for generating stickers, specific processes and technical effects of the extraction unit 501, the emotion identification unit 502 and the generation unit 503 can be respectively referred to relative illustration of step 201, step 202 and step 203 in the embodiment as shown in FIG. 2, which will not be repeated herein.

In some optional embodiments, the emotion identification unit 502 can further be disposed to: input each of the plurality of target images into pre-trained convolutional neural networks to obtain the corresponding identification results; the convolutional neural networks are configured for identifying emotions.

In some optional embodiments, the generation unit 503 can include: a first searching subunit (not shown), which is disposed to search a first target image whose emotional level corresponding to the emotion label is not lower than a top threshold in a corresponding identification result from each of the plurality of target images; a second searching subunit (not shown), which is disposed to backward search a second target image whose emotional level corresponding to the emotion label is not higher than a bottom threshold in an identification result corresponding to a first image starting from the first target image in each of the plurality of target images; a third searching subunit (not shown), which is disposed to forward search a third target image whose emotional level corresponding to the emotion label is not higher than the bottom threshold in the identification result corresponding to the third first image starting from the first target image in each of the plurality of target images; and an extracting subunit (not shown), which is disposed to extract the video fragment from the person-contained video based on the second target image and the third target image.

In some optional embodiments, the extracting subunit can be further disposed to: cut the video fragment taking the second target image as an opening section and taking the third target image as an ending section from the person-contained video.

In some optional embodiments, the extracting subunit can be further disposed to: taking the second target image as a starting point and taking the third target image as an ending point, extract a plurality of continuous target images from each of the plurality of target images, and generate the video fragment by the plurality of continuous target images.

In some optional embodiments, the device 500 further can include: a face detection unit (not shown), which is disposed to identify the faces of each image in the image sequence to obtain a corresponding face detection result before the emotion identification unit identifies emotions of the faces respectively displayed by each of the plurality of target images in the image sequence; wherein the face detection result is configured for indicating whether an image displays a face or not.

The device for generating stickers provided by the embodiments of the disclosure extract an image sequence from a person-contained video to be processed; identify emotions of the faces respectively displayed by each of the plurality of target images in the image sequence to obtain corresponding identification results; based on the emotional levels corresponding to the emotion labels in the identification results corresponding to each of the plurality of target images, extract a video fragment from the person-contained video, and act the video fragment as the stickers. The image sequence comprises a plurality of target images displaying faces; the identification results comprise emotion labels and emotional levels corresponding to the emotion labels. The scheme described by the forgoing embodiment of the disclosure can extract the video fragment from the given person-contained video to act as stickers based on the facial emotion match, which can achieve the generation of stickers based on the facial emotion match.

Figure 6:
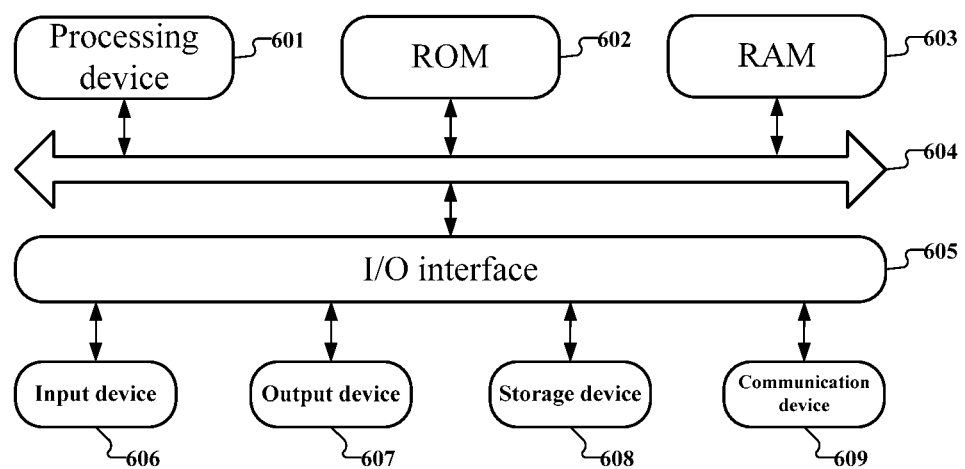
FIG. 6 is a structural schematic view of a computer system for implementing an electronic device adapted for an embodiment of the disclosure.

Reference is now made to FIG. 6 which shows a structure diagram of a computer system 600 of electronic equipment (such as the server 105 shown in FIG. 1) applicable to implementing an embodiment of the present disclosure. The terminal device in the embodiments of the disclosure can include but not limited to a mobile terminal such as a mobile phone, a laptop, a digital broadcasting receiver, a personal digital assistant, a pad, a portable multimedia player, a vehicular terminal (such as a vehicular navigation terminal) and a fixed terminal such as a digital TV, a desktop, etc. The electronic equipment shown in FIG. 6 is merely an example and should not pose any limitation on functions and disclosure ranges of the embodiments of the disclosure.

As shown in FIG. 6, the computer system 600 includes a processing device (such as a central processing unit, an image processor, etc.) 601 which can execute various appropriate actions and processes according to programs stored in a read-only memory (ROM) 602 or programs loaded to a random-access memory (RAM) 603 from a storage device 608. Various programs and data required by operation of the system 600 are also stored in the RAM 603. The processing device 601, ROM 602 and RAM 603 are connected to one another through a bus 604. An input/output (I/O) interface 605 is also connected to the bus 604.

In common, the I/O interface 605 can be connected with following devices: an input device 606 including a touch screen, a touch panel, a keyboard, a mouse, etc.; an output device 607 including a cathode-ray tube (CRT), a liquid crystal display (LCD), a loudspeaker, etc.; a storage device 608 including a hard disk, etc.; and a communication device 609. The communication device 609 can permit the electronic device 600 to communicate with other devices wirelessly or not for exchanging data. Although FIG. 6 shows the electronic device 600 of various devices, not all devices are required to be processed or owned. More or less device can be processed or owned. Each block shown in FIG. 6 can represent a device, or represent more devices according to requirements.

Specifically, processes described above with reference to flowcharts may be implemented as computer software programs in accordance with embodiments of the disclosure. For example, an embodiment of the present disclosure comprises a computer program product which comprises a computer program carried on a computer readable medium, and the computer program comprises program codes used for executing the method shown in the flowchart. In such embodiment, the computer program may be downloaded from the network through the communication device 609 and installed, or installed from the storage device 608, or installed from ROM 602. When the computer program is executed by the processing device 601, a function defined in the method provided by the disclosure is executed.

It should be noted that the computer readable medium of the present disclosure may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present disclosure, the computer readable storage medium may be any tangible medium that contains or stores a program that can be used by or in combination with an instruction execution system, apparatus, or device. In the present disclosure, a computer readable signal medium may include a data signal propagating in a baseband or as a part of a carrier wave, and computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The computer readable medium may be included in the electronic equipment described in the above embodiments, or may also present separately without being assembled into the electronic device. The above computer readable medium carries one or more programs. When one or more programs above are executed by the electronic device, the electronic device is enabled to extract an image sequence from a person-contained video to be processed; identify emotions of the faces respectively displayed by each of the plurality of target images in the image sequence to obtain corresponding identification results; based on the emotional levels corresponding to the emotion labels in the identification results corresponding to each of the plurality of target images, extract a video fragment from the person-contained video, and act the video fragment as the stickers. The image sequence comprises a plurality of target images displaying faces; the identification results comprise emotion labels and emotional levels corresponding to the emotion labels.

The computer program codes for carrying out operation of the present application may be written by one or more programming languages, or a combination thereof, the programming languages include object oriented programming languages, such as Java, Smalltalk, C++, as well as conventional procedural programming languages, such as a "C" language or similar programming languages. The program codes may be executed entirely on a user computer, or partly on the user computer, or as a separate software package, or partly on the user computer and partly on a remote computer, or entirely on the remote computer or the server. In situations involving the remote computer, the remote computer may be connected to the user computer through any kind of network, including a local area network (LAN) or a wide area network (WAN), or may be connected to an external computer (for example through the Internet by virtue of an Internet service provider).

The flowcharts and block diagrams in the figures illustrate the possible system architecture, functions, and operation of systems, methods, and computer program products according to various embodiments of the present disclosure. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the disclosure may be implemented in a software mode or in a hardware mode. The names of the units do not, in some cases, constitute limitation on the units themselves. For example, the extraction unit can further be described as "a unit extracting an image sequence from a person-contained video to be processed".

The above description is merely the illustration of preferred embodiments of the present disclosure and the technical principles used. It should be understood by those skilled in the art that the scope of the present disclosure referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present disclosure.

What is claimed is:

1. A method for generating stickers, comprising:
  extracting an image sequence from a person-contained video to be processed; wherein the image sequence comprises a plurality of target images displaying faces;
  identifying emotions of the faces respectively displayed by each of the plurality of target images in the image sequence to obtain corresponding identification results; wherein the identification results comprise emotion labels and emotional levels corresponding to the emotion labels; and extracting a video fragment from the person-contained video as the stickers based on the emotional levels corresponding to the emotion labels in the identification results corresponding to each of the plurality of target images, wherein the extracting a video fragment from the person-contained video based on the emotional levels corresponding to the emotion labels in the identification results corresponding to each of the plurality of target images further comprises:
searching each of the plurality of target images for a first target image, wherein the first target image corresponds to the emotion label in a corresponding identification result and has an emotional level no lower than a top threshold,
searching backward a second target image whose emotional level corresponding to the emotion label is not higher than a bottom threshold in an identification result corresponding to a first image by starting from the first target image in each of the plurality of target images,
searching forward a third target image whose emotional level corresponding to the emotion label is not higher than the bottom threshold in the identification result corresponding to the third first image by starting from the first target image in each of the plurality of target images, and
extracting the video fragment from the person-contained video based on the second target image and the third target image.

2. The method according to claim 1, wherein the identifying emotions of the faces respectively displayed by each of the plurality of target images in the image sequence to obtain corresponding identification results comprises:
inputting each of the plurality of target images into pre-trained convolutional neural networks to obtain the corresponding identification results; wherein the convolutional neural networks are configured for identifying emotions.

3. The method according to claim 1, wherein the extracting the video fragment from the person-contained video based on the second target image and the third target image comprises:
capturing the video fragment from the person-contained video by taking the second target image as an opening section and taking the third target image as an ending section.

4. The method according to claim 1, wherein the extracting the video fragment from the person-contained video based on the second target image and the third target image comprises:
extracting a plurality of continuous target images from each of the plurality of target images by taking the second target image as a starting point and taking the third target image as an ending point, so as to form the video fragment.

5. The method according to claim 1, wherein before the identifying emotions of the faces respectively displayed by each of the plurality of target images in the image sequence to obtain corresponding identification results, the method further comprises:
identifying the faces of each image in the image sequence to obtain a corresponding face detection result; wherein the face detection result is configured for indicating whether an image displays a face or not.

6. A device for generating stickers, comprising:
at least one processor; and
at least one memory communicatively coupled to the at least one processor and storing instructions that upon execution by the at least one processor cause the device to:
extract an image sequence from a person-contained video to be processed; wherein the image sequence comprises a plurality of target images displaying faces;
identify emotions of the faces respectively displayed by each of the plurality of target images in the image sequence to obtain corresponding identification results; wherein the identification results comprise emotion labels and emotional levels corresponding to the emotion labels; and
extract a video fragment from the person-contained video based on the emotional levels corresponding to the emotion labels in the identification results corresponding to each of the plurality of target images as the stickers, wherein the at least one memory further stores instructions that upon execution by the at least one processor cause the device to:
search a first target image whose emotional level corresponding to the emotion label is not lower than a top threshold in a corresponding identification result from each of the plurality of target images,
search backward a second target image whose emotional level corresponding to the emotion label is not higher than a bottom threshold in an identification result corresponding to a first image starting from the first target image in each of the plurality of target images,
search forward a third target image whose emotional level corresponding to the emotion label is not higher than the bottom threshold in the identification result corresponding to the third first image starting from the first target image in each of the plurality of target images, and
extract the video fragment from the person-contained video based on the second target image and the third target image.

7. The device according to claim 6, wherein the at least one memory further stores instructions that upon execution by the at least one processor cause the device to:
input each of the plurality of target images into pre-trained convolutional neural networks to obtain the corresponding identification results; wherein the convolutional neural networks are configured for identifying emotions.

8. The device according to claim 6, wherein the at least one memory further stores instructions that upon execution by the at least one processor cause the device to:
capture the video fragment by taking the second target image as an opening section and taking the third target image as an ending section from the person-contained video.

9. The device according to claim 6, wherein the at least one memory further stores instructions that upon execution by the at least one processor cause the device to:
extract a plurality of continuous target images from each of the plurality of target images, and
generate the video fragment by the plurality of continuous target images by taking the second target image as a starting point and taking the third target image as an ending point.

10. The device according to claim 6, wherein the at least one memory further stores instructions that upon execution by the at least one processor cause the device to:
identify the faces of each image in the image sequence to obtain a corresponding face detection result before the emotion identification unit identifies emotions of the faces respectively displayed by each of the plurality of target images in the image sequence; wherein the face detection result is configured for indicating whether an image displays a face or not.

11. A non-transitory computer readable medium, stored with a computer program therein, wherein the computer program is executed by a processor to perform operations of:

extracting an image sequence from a person-contained video to be processed; wherein the image sequence comprises a plurality of target images displaying faces;

identifying emotions of the faces respectively displayed by each of the plurality of target images in the image sequence to obtain corresponding identification results; wherein the identification results comprise emotion labels and emotional levels corresponding to the emotion labels; and extracting a video fragment from the person-contained video as the stickers based on the emotional levels corresponding to the emotion labels in the identification results corresponding to each of the plurality of target images, wherein the operations further comprise:

searching each of the plurality of target images for a first target image, wherein the first target image corresponds to the emotion label in a corresponding identification result and has an emotional level no lower than a top threshold, searching backward a second target image whose emotional level corresponding to the emotion label is not higher than a bottom threshold in an identification result corresponding to a first image by starting from the first target image in each of the plurality of target images, searching forward a third target image whose emotional level corresponding to the emotion label is not higher than the bottom threshold in the identification result corresponding to the third first image by starting from the first target image in each of the plurality of target images, and extracting the video fragment from the person-contained video based on the second target image and the third target image.

12. The non-transitory computer readable medium according to claim 11, wherein the operations further comprise:

inputting each of the plurality of target images into pre-trained convolutional neural networks to obtain the corresponding identification results; wherein the convolutional neural networks are configured for identifying emotions.

13. The non-transitory computer readable medium according to claim 11, wherein the operations further comprise:

capturing the video fragment from the person-contained video by taking the second target image as an opening section and taking the third target image as an ending section.

14. The non-transitory computer readable medium according to claim 11, wherein the operations further comprise:

extracting a plurality of continuous target images from each of the plurality of target images by taking the second target image as a starting point and taking the third target image as an ending point, so as to form the video fragment.

15. The non-transitory computer readable medium according to claim 11, wherein the operations further comprise:

identifying the faces of each image in the image sequence to obtain a corresponding face detection result; wherein the face detection result is configured for indicating whether an image displays a face or not.

* * * * *